United States Patent [19]
Ohlmeyer et al.

[11] Patent Number: 4,940,567
[45] Date of Patent: Jul. 10, 1990

[54] APPARATUS FOR CATALYTICALLY REDUCING NOXIOUS SUBSTANCES IN FLUE GAS

[75] Inventors: Manfred Ohlmeyer, Eggenstein-Leopoldshafen; Martin Benzel, Aachen, both of Fed. Rep. of Germany

[73] Assignee: Kernforschungszentrum Karlsruhe GmbH, Karlsruhe, Fed. Rep. of Germany

[21] Appl. No.: 189,176

[22] Filed: May 2, 1988

Related U.S. Application Data

[62] Division of Ser. No. 919,708, Oct. 16, 1986, Pat. No. 4,756,891, and Ser. No. 117,309, Nov. 6, 1987, Pat. No. 4,810,476.

[30] Foreign Application Priority Data

Oct. 17, 1985 [DE] Fed. Rep. of Germany ....... 3536958
Nov. 6, 1986 [DE] Fed. Rep. of Germany ....... 3637871

[51] Int. Cl.$^5$ ............................................. B01D 53/36
[52] U.S. Cl. .................................... 422/173; 422/177;
   422/183; 422/198; 422/206; 422/213; 423/239;
                              423/244; 423/DIG. 13; 502/21
[58] Field of Search ............... 422/173, 177, 183, 198,
       422/206, 213; 423/239, 244 R, DIG. 13; 502/21

[56] References Cited

U.S. PATENT DOCUMENTS 4,602,673  7/1986  Michelfelder et al. ............. 423/239
4,756,891  7/1988  Ohlmeyer et al. ............. 423/235 X
4,810,476  3/1989  Ohlmeyer et al. .................. 423/239

FOREIGN PATENT DOCUMENTS 2755314  8/1979  Fed. Rep. of Germany .
3335917  5/1985  Fed. Rep. of Germany .
3407277  8/1985  Fed. Rep. of Germany .
3505354  10/1985 Fed. Rep. of Germany .
3536958  11/1986 Fed. Rep. of Germany .

Primary Examiner—Robert J. Warden
Assistant Examiner—Lynn M. Kummert
Attorney, Agent, or Firm—Spencer & Frank

[57] ABSTRACT

Apparatus for catalytically reducing noxious substances in flue gas employes, in a first embodiment wherein combustion air is also pre-heated, a two-part heat-exchanger which is traversed from top to bottom by a plurality of catalytically active, separately movable heat-storage elements. Combustion gas is heated in a first portion of the heat-exchanger by heat transferred from the heat-storage elements and the noxious gases are catalytically reduced in a second portion of the heat-exchanger downstream from the first portion in the presence of ammonia and the heat-storage elements. The heat-storage elements can be removed from circulation and replaced by unspent or regenerated elements when the residual content of noxious substances in the flue gas remains elevated. In a second embodiment, flue gas cooled downstream of a desulfurization system is conducted through the bottom section of the heat exchanger where it is preheated by the heat storage elements and is then heated to a predetermined reaction temperature by an external heating means. Ammonia is added and the flue gas is conducted at least once through at least one middle section for the catalytic reduction. Then, the flue gas is conducted through the top section so as to cool it to a predetermined chimney entrance temperature. The apparatus prevents decreases in catalytic activity and prevents adverse affects on catalyst efficiency due to leakages from a gas preheater for the flue gas. The heat exchanger can be used advantageously downstream of a desulfurization system.

12 Claims, 5 Drawing Sheets

APPARATUS FOR CATALYTICALLY REDUCING NOXIOUS SUBSTANCES IN FLUE GAS

This application is a composite divisional application of copending application Ser. No. 06/919,708 filed Oct. 16th, 1986, now U.S. Pat. No. 4,756,891 and copending application Ser. No. 07/117,309 filed Nov. 6th, 1987, now U.S. Pat. No. 4,810,476.

BACKGROUND OF THE INVENTION

1. Field of the Invention

The present invention relates to a method and apparatus for pre-heating combustion air and catalytically reducing noxious substances in flue gas.

2. Description of the Background

German Published Patent Application No. 3,335,917 discloses a pre-heater for air having a regenerative or recuperative configuration. In the prior art apparatus, the surfaces of the heat-exchanger elements on the flue gas side are provided with a coating which acts as a catalyst for $NO_x$ reduction. The regenerative air pre-heater shown in FIG. 5 of that publication includes a rotating drum and is equipped for radial gas influx. In this prior art apparatus, the heat-storage substance is composed of a plurality of individual movable elements in the form of spheres, e.g., hollow spheres or saddle-shaped bodies, which are provided with a catalyst coating. The drum is subdivided radially into individual chambers so as to accommodate the individual elements. This integration of the $NO_x$ reactor into the air pre-heater serves primarily to reduce the space requirement of the system. According to FIG. 6 of the reference, a first air pre-heater with the shape of a tube or plate and a second air pre-heater are connected in series in the manner of a heat-exchange column. The heat-exchange column includes a storage substance composed of a plurality of separately movable elements which are turned by a transporting device. However, only the heat-exchange elements of the plate- or tube-shaped heat-exchanger are provided with a catalyst coating. In both cases, the elements coated with the catalyst layer form static or quasi-static components. Due to their decreasing catalytic activity over their service life, these elements must be considerably larger than would be necessary in theory to attain a service life which is economically justifiable for the operation of a power plant, e.g., up to three years. For example, a catalyst subdivided into three layers will have an average service life of only about 1.3 years per layer. This is the case even if it is coated with a substance roughly 35% above the theoretical requirement. In addition, the entire system must be shut down after reaching its lower activity limit for the exchange or partial exchange of the catalyst-coated elements.

It is known to perform flue gas desulfurization before catalytic reduction of the noxious substances as disclosed in German Published Application No. 3,407,277. This substantially protects the sensitive catalyst from sulfur compounds. To keep the required external energy for reheating the flue gas as low as possible, however, a regenerative gas preheater is connected in the circuit. Leakages from this regenerative gas preheater are known to adversely affect the efficiency of the catalyst and, thus, to require a corresponding enlargement of the quantity of catalyst, because this preheater effects polluting the cleaned flue gas with uncleaned flue gas.

SUMMARY OF THE INVENTION

It is an object of the present invention to prevent a decrease in catalytic activity within such systems and reduce even further the space requirement of such systems.

It is a further object of the present invention to further improve such systems so that they can be used advantageously downstream of a desulfurization system wherein the flue gas is cooled and, additionally, so that leakages from a gas preheater, required for preheating of the flue gas, are avoided.

The above and other objects of the invention are attained by a first embodiment of a method of continuously pre-heating combustion air and catalytically reducing noxious substances in flue gas. The method comprises passing through a first portion and a second portion of a heat-exchanger a plurality of groups of heated separately movable heat-storage elements differing from each other in at least one significant characteristic on the basis of which these groups can be separated from one another, said heated elements comprising catalytically active catalyst-coated heat-storage elements; passing combustion air through said first portion of said heat-exchanger to transfer heat from said elements to said air, and passing heated flue gas containing noxious substances and ammonia through said second portion of said heat-exchanger to transfer heat from said flue gas to said elements while simultaneously catalytically reducing said noxious substances, said air and said flue gas flowing in a direction transverse to the direction of the flow of said elements and substantially in the absence of leakages of air and flue gas between said first portion and said second portion of said heat-exchanger; and removing said elements from said second portion of said heat-exchanger and reintroducing said elements into said first portion of said heat-exchanger, said step of removing including disposing of elements of one group removed from said heat-exchanger and substituting therefor unspent or regenerated elements of a different one of said groups as a function of the content of noxious substances in the flue gas flowing out of said heat-exchanger.

The above and other objects are also attained by providing a first embodiment of an apparatus for continuously pre-heating combustion air and catalytically reducing noxious substances in flue gas, comprising a heat-exchanger housing having a first part and a second part and gas-permeable interior walls provided to contain and permit the flow of a plurality of separately movable heat-storage elements comprising catalyst-coated heat-storage elements, and a means providing a constrictive passage for the elements, said constrictive means operatively connected onto said first part and said second part of said housing, said first part of said housing having an inlet for said elements and an inlet and an outlet for said air and said second part of said housing having an outlet for said elements and an inlet and an outlet for said flue gas; means for removal of said elements from the outlet for said elements and resupply of said elements to the inlet for said elements, the inlet and the outlet for said elements defining a first direction of flow of said elements which is transverse to a second direction of flow of said air and said flue gas; and discharge means for said elements provided with a means for separating said elements by size, shape or weight, said discharge means being operatively connected to said second part of said housing and to said removal and resupply means at the outlet for said elements.

These and other objects of the invention are attained by a second embodiment of a process for catalytically reducing noxious substances contained in flue gas which includes passing a plurality of heat storage elements which are separately movable in a direction of passage, for example, downwardly, through a top section, at least one middle section, and a bottom section of a heat exchanger in the order recited, at least a portion of the plurality of heat storage elements being provided with a catalyst coating and being divided into a plurality of groups, each group of the plurality of groups differing from other groups of the plurality of groups in at least one significant characteristic, such as at least one physical characteristic selected from size, shape and weight, on the basis of which the plurality of groups may be separated from one another. Further, flue gas is passed through the heat exchanger in a direction transverse to the direction of passage of the heat storage elements by first conducting the flue gas discharged from and cooled within a desulfurization system through the bottom section of the heat exchanger to preheat the flue gas by contact thereof with the plurality of heat storage elements and to bring the flue gas to a predetermined reaction temperature by means of an external heating means. Second, ammonia is added to the flue gas and the flue gas is conducted through the at least one middle section of the heat exchanger at least once for catalytic reduction of the noxious substances by contact thereof with the catalyst coating provided on at least a portion of the plurality of heat storage elements. Third, the flue gas is conducted through the top section of the heat exchanger to cool the flue gas to a predetermined chimney entrance temperature by contact thereof with the plurality of heat storage elements. Finally, the plurality of heat storage elements is removed from the bottom portion of the heat exchanger and the plurality of heat storage elements are reintroduced into the top section of the heat exchanger, wherein the removing step includes disposing of at least one spent group of the plurality of groups of heat storage elements and substituting therefor at least one different and unspent or regenerated group of the plurality of groups of heat storage elements.

The disposing of spent heat storage elements and substituting therefor unspent or regenerated heat storage elements may be initiated by measuring noxious substance concentrations of, for example, $NO_x$ and $NH_3$, in the flue gas exiting the top section of the heat exchanger and causing disposing and substituting when the noxious substance concentrations exceed predetermined allowable noxious substance concentrations.

The removing step may include sorting the plurality of heat storage elements exiting the bottom section of the heat exchanger in a sorting means, such as a grate, to separate the plurality of groups from one another on the basis of the at least one significant characteristic.

The process may further include cleaning the plurality of heat storage elements removed from the bottom portion of the heat exchanger to remove dust and abrasion products therefrom.

The objects of the invention are also attained by a second embodiment of an apparatus for catalytically reducing noxious substances in flue gas which includes a plurality of heat storage elements which are separately movable and at least a portion which are provided with a catalyst coating and are divided into a plurality of groups, each group of the plurality of groups differing from other groups of the plurality of group in at least one significant characteristic, such as at least one physical characteristic selected from size, shape and weight, on the basis of which the plurality of groups may be separated from one another. A heat exchanger housing is provided having interconnected sections including a top section, at least one middle section, and a bottom section, and having gas-permeable interior walls provided to contain and permit the flow of the plurality of heat storage elements in a direction of passage, for example, downwardly, through the top section, the at least one middle section and the bottom section in the order recited. Means connecting the bottom section of the heat exchanger housing to a source of flue gas and means connecting the top section of the heat exchanger housing to a chimney entrance are employed. Means for removing the plurality of heat storage elements from the bottom section of the heat exchanger housing and means for reintroducing the plurality of the heat storage elements into the top section of the heat exchanger housing are also employed, the means for removing including a discharge mean operatively connected to the bottom section of the heat exchanger housing and sorting means for separating the plurality of groups from one another and operatively connected to the discharge means and to the means for reintroducing the plurality of heat storage elements into the top section of the heat exchanger housing.

The heat exchanger housing of the second embodiment of the inventive apparatus repeatedly deflects the flow of flue gas such that the flue gas passes from the bottom section, through the at least one middle section, and through the top section in a direction which is transverse to the direction of passage of the plurality of heat storage elements. The bottom section of the heat exchanger housing is provided with external heating means downstream of the flue gas for heating the flue gas to a predetermined reaction temperature. The at least one middle section of the heat exchanger housing is provided with at least one means for dosaging ammonia therein for catalytic reduction of the noxious substances in the flue gas. The flue gas is cooled to a predetermined chimney entrance temperature in the top section of the heat exchanger housing.

The sorting means, such as a grate, separates the plurality of groups of heat storage elements from one another on the basis of the at least one significant characteristic which is a physical characteristic selected from size, shape and weight. The plurality of heat storage elements preferably have a spherical shape.

The apparatus of the second embodiment may further include means for disposing of at least one spent group of the plurality of groups of heat storage elements and substituting therefor at least one different and unspent or regenerated group of the plurality of groups of heat storage elements. The apparatus may further include means for measuring noxious substance concentrations of the flue gas exiting the top section of the heat exchanger and means for causing disposing and substituting of the at least one spent group when the noxious substance concentrations exceed predetermined allowable noxious substance concentrations.

The discharge means may include means for cleaning the plurality of heat storage elements to remove dust and abrasion products therefrom, such as, a brush.

As for the first embodiment of the invention, the second embodiment also results in a considerable reduction in the catalyst mass. The second embodiment, moreover, prevents the occurrences of undesirable leakages, as have been heretofore unavoidable with a regenerative gas preheater positioned between the streams of cold, uncleaned and warm, cleaned flue gas, since preheating and cooling of the flue gas according to the second embodiment take place within the heat exchanger and by means of separately movable heat storage elements. Additionally, the second embodiment provides for structural simplifications since all process steps are performed in a uniform, closed heat exchanger and reaction housing.

The first embodiment of the present invention makes it possible to design the portion of the heat-exchanger charged with the flue gas only barely above the theoretical value for the required catalyst substance. If catalyst activity decreases somewhat, the spent catalytically-coated heat-storage elements are replaced by new ones without interrupting the operation of the system until the complete original activity has been attained again. By providing a classification according to size, shape or weight, care is taken that only spent elements of a certain type are removed while new fresh elements of another type are filled in.

These processes are advisably controlled as a function of the residual content of noxious substances, e.g., $NO_x$ (~200 mg/m$^3$) and $NH_3$ (~5 Vpm), in the flue gas once it leaves the system. In this way it is assured that the content of residual noxious substances is kept as low as possible, particularly below given limits. The spent heat-storage elements can be regenerated after removal and then reused again. Moreover, in the course of the turnover, the individual elements can be subjected to a cleaning process, e.g., by shaking, after they have been removed from the heat-exchanger section charged with flue gas.

BRIEF DESCRIPTION OF THE DRAWING

Further objects and advantages of the present invention and the structure and operation of the two embodiments of the inventive apparatus and method will become apparent to those skilled in the art of flue gas treatment from the following detailed descriptions taken in conjunction with the drawing figures in which.

Other objects, advantages and features of the present invention will become apparent to those skilled in the art from the following discussion.

DESCRIPTION OF THE PREFERRED EMBODIMENTS

Figure 1:
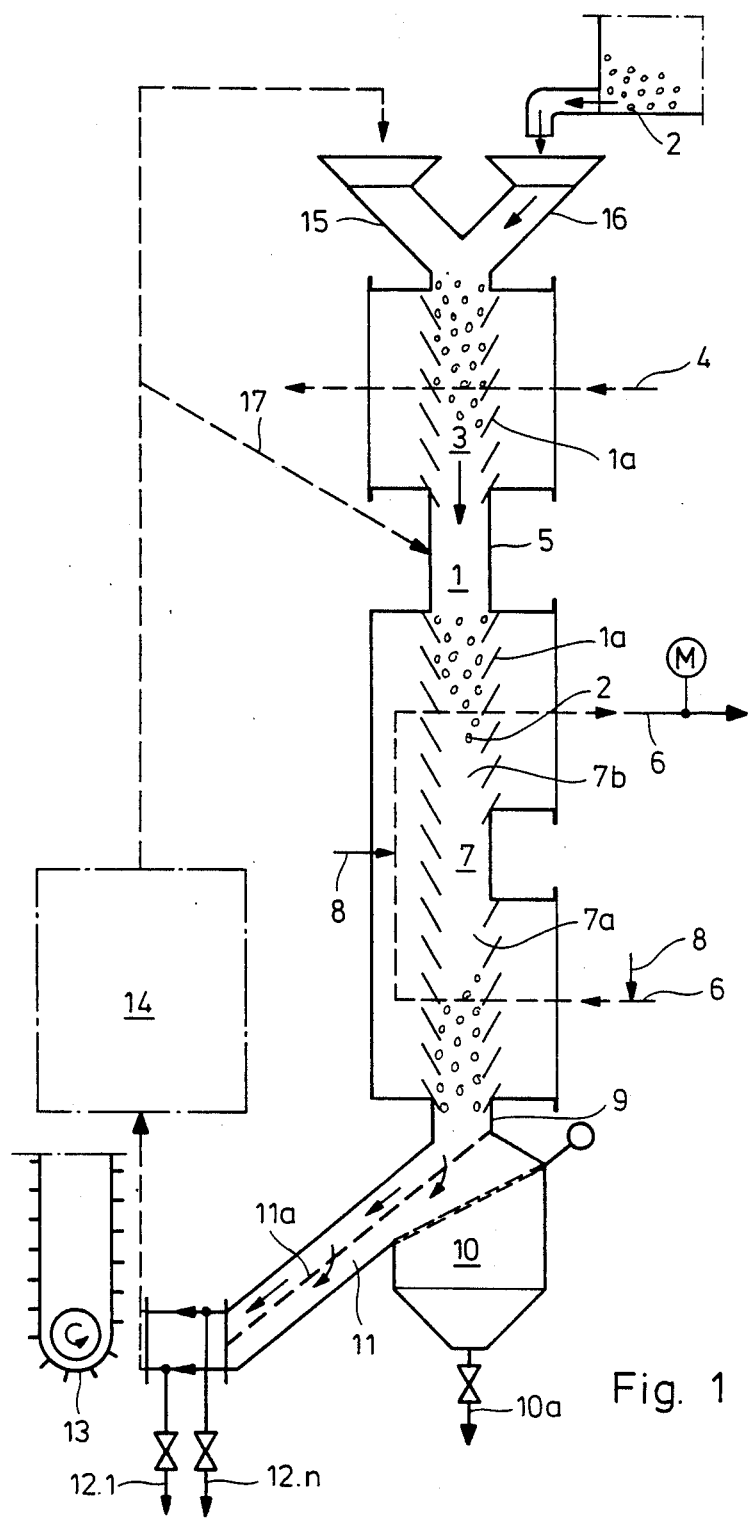
FIG. 1 is a schematic longitudinal section of a first embodiment of an apparatus for pre-heating combustion air and catalytically reducing noxious substances combined with a device for the turnover of the heat-storage elements according to the invention.

In the first embodiment of the inventive apparatus, a two-part heat-exchanger 1 having gas permeable interior walls 1a, as shown in FIG. 1, is traversed from top to bottom by a plurality of separately movable heat-storage elements 2 which may have, e.g., a spherical shape and at least a catalytically-coated part thereof. The combustion air 4 flows through the upper part 3 (LUVO, pre-heater) of heat-exchanger 1 in a simple cross-flow and is thereby heated, for example from 20° to 200° C., while the heat-storage elements cool correspondingly from 320° C. down to 160° C. Then heat-storage elements 2 are also added from the filling device 16 which contains new or regenerated elements 2. The heat-storage elements travel through a tight lock 5 with the same cross-section as the heat-exchanger parts 3 and 7 and which prevents leakage streams between the combustion air 4 and the flue gas 6. The elements 2 then travel to the lower part 7 of heat-exchanger 1 where the noxious substances ($NO_x$) contained in the flue gas are reduced in the presence of ammonia 8, and the flue gas 6 is thus cooled from, e.g., 350° C. to 180° C., while simultaneously the storage elements are correspondingly heated from 160° C. up to 320° C.

The reduction of noxious substances can be optimized by providing multiple charges in the lower portion 7 of heat-exchanger 1. This can be attained while setting up various temperature levels 7a (240° to 320° C.), 7b (160° to 240° C.), providing the heat-storage elements 2 with different catalytic coatings adapted to the temperature levels 7a, 7b and adding a corresponding quantity of ammonia 8. Multiple charges can be provided, e.g., in a cross countercurrent as is shown in FIG. 1. After leaving the lower heat-exchanger 7 the flue gas 6 is fed to cleaning devices such as electric filters and flue gas desulfuring devices to conduct the corresponding processes (not shown).

After passing through heat-exchanger 1, the heat-storage elements 2 are conducted from the lower end of the heat-exchanger 1 through a discharge station 9 and a cleaning device 10 with a dust removal device 10a to a sorting device 11 equipped with a grate 11a. Thereafter, the heat-storage elements 2 are conducted past removal devices 12.1 to 12.n through a turnover device 13 and then back to the top where they are reintroduced into the upper part 3 of heat-exchanger 1 through the filling device 15 for the circulating heat-storage elements 2.

Figure 3:
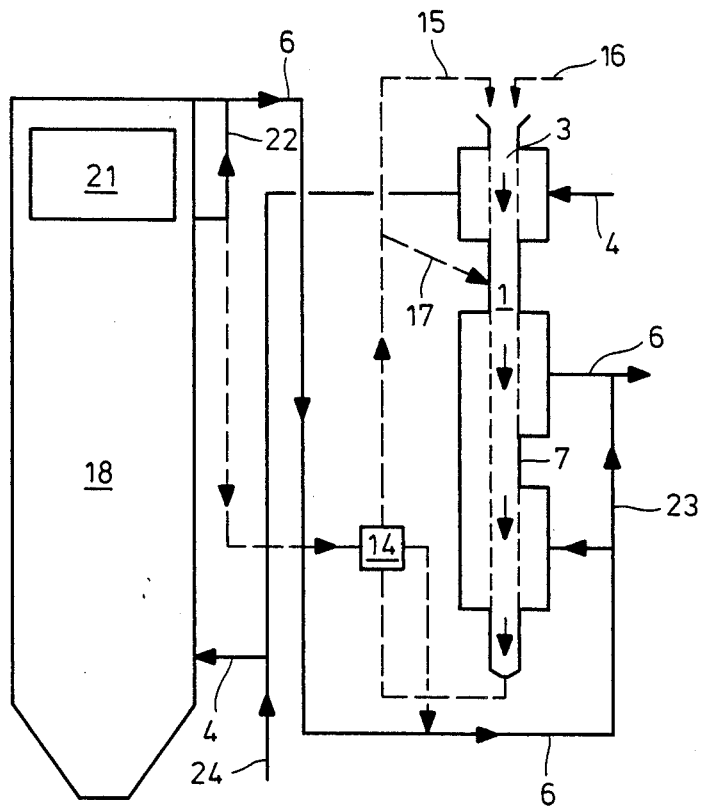
FIG. 3 is a schematic longitudinal diagram showing a preferred connection according to FIG. 2, employing the first embodiment of the present invention as shown in FIG. 1.

Stabilized temperature levels can be maintained in the lower part 7 of heat-exchanger 1 by means of a heating device 14 and by way of direct or indirect heating of the heat-storage elements 2 even if there is only a partial load and the boiler system 18 is in the start-up state (FIG. 3).

The following can be added to the process in conjunction with the use of a by-pass 17 to avoid the upper part of the heat-exchanger 3, preferably when the process is conducted with a partial load or is in the start-up stage. The temperature levels in 3 and 7 may be varied while maintaining the same transfer of heat in 3 and 7 to preserve optimum temperatures, e.g., in 7a and 7b, for catalytic reduction even if there are variations in the load. For this purpose, part of the elements 2 are reintroduced through by-pass 17 of lock 5 between the upper part 3 and the lower part 7 of heat-exchanger 1 while the remainder of elements 2 are re-introduced at 15.

In the embodiments of the present process, the catalytic effect of the coated heat-exchanger elements 2 persists longer than in static systems due to the self-cleaning effect produced by the constant circulation in the heat-exchanger. However, it is necessary to constantly renew some of the heat-storage elements in order to maintain the reduction of noxious substances constant over time. To avoid that, during the constant circulation of heat-storage elements, newly supplied heat-storage elements are removed right away and a class of heat-storage elements different from the class to be removed by removal devices 12.1 to 12.n is fed in at 16. Thus, replenishment takes place by way of a level regulation in the case of abrasion or the like. This is important since under average conditions the heat-storage elements may be assumed to circulate through the system one to three times per hour. In the simplest case, heat-exchange elements 2 have a spherical shape where the individual classes differ from one another by having different sphere diameters.

A sorting device 11 is provided with one or more grates 11a which separates spheres having different diameters and thus supplies them in classified order to the respective removal devices 12.1 to 12.n by means of which they can be removed.

The removal process taking place at devices 12.1 to 12.n and the addition of new spheres at 16 is regulated by a measuring station M which measures the residual content of noxious substances in flue gas 6, once the latter has left heat-exchanger part 7.

It is assumed that when placed in service the system is filled with ceramic or metal based heat-storage elements having a uniform diameter x of an order of magnitude between about 15 and 35 mm. Then, the supply is supplemented at 16 with heat-storage elements having a diameter of x+y and, if necessary, only heat-storage elements having a diameter of x are removed at 12. If all of the x elements have been removed, a change is made, i.e. x+y is removed and x is refilled from the supply. The procedure is analogous if there are two or more different types of heat-storage elements 2. For example, if elements having diameters x and x+y are removed, elements having diameters x+a and x+b are introduced. Later on, x and x+y elements are introduced and x+a and x+b elements are withdrawn. This example shows that many possible variations can be implemented while practicing the method according to the invention.

Figure 2:
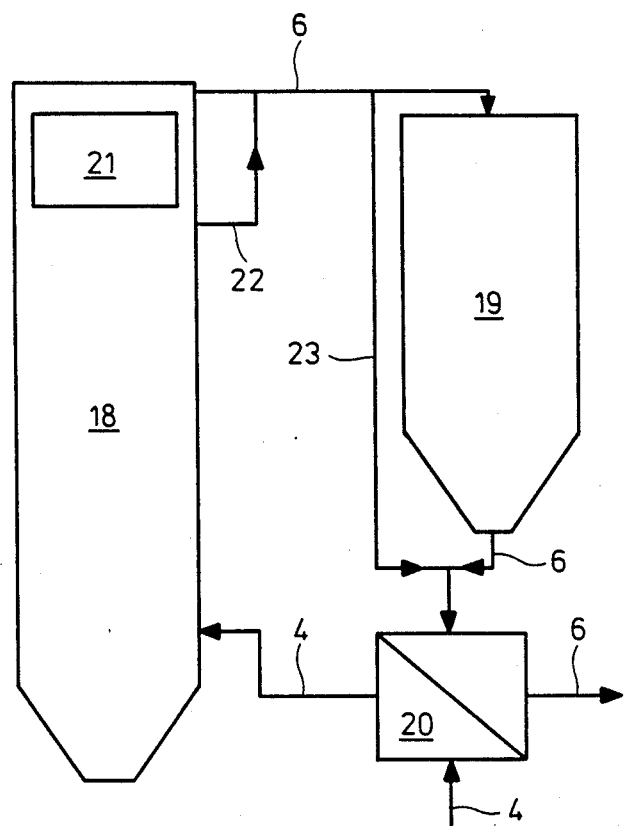
FIG. 2 is a schematic longitudinal diagram of the previously customary connection of an air pre-heater and catalyst downstream of a boiler system.

FIG. 2 shows a typical prior art connection of a catalyst 19 (static system) and an air pre-heater 20 (conventional design) downstream of a boiler system 18. As can be seen, a change in the temperature level in the air pre-heater 20 has no influence on the catalyst 19 since the air-pre-heater 20 lies downstream of the catalyst 19 in the stream of the flue gas 6. The operating temperatures can only be influenced when the process is conducted at partial load or is at the starting stage by using a water supply pre-heater by-pass 22 which avoids the water supply pre-heater 21 and/or by using a by-pass 23 which avoids the catalyst 19.

FIG. 3 shows the installation of the apparatus according to the invention which has a heat-exchanger 1 instead of a catalyst 19 and an air pre-heater 20. In addition to reducing the space requirement, this substitution also broadens and thus improves the possibilities for influencing the temperature of catalytic reduction during partial load operation and at the starting stage.

As shown in FIG. 2, this was possible in the past only by incorporating the water supply heater by-pass 22 and the catalyst by-pass 23. The present invention provides as individual or combined alternatives the additional possibilities of incorporating an air pre-heater by-pass 24, a heat-storage element by-pass 17 and a heat-storage element heating device 14.

Figure 4:
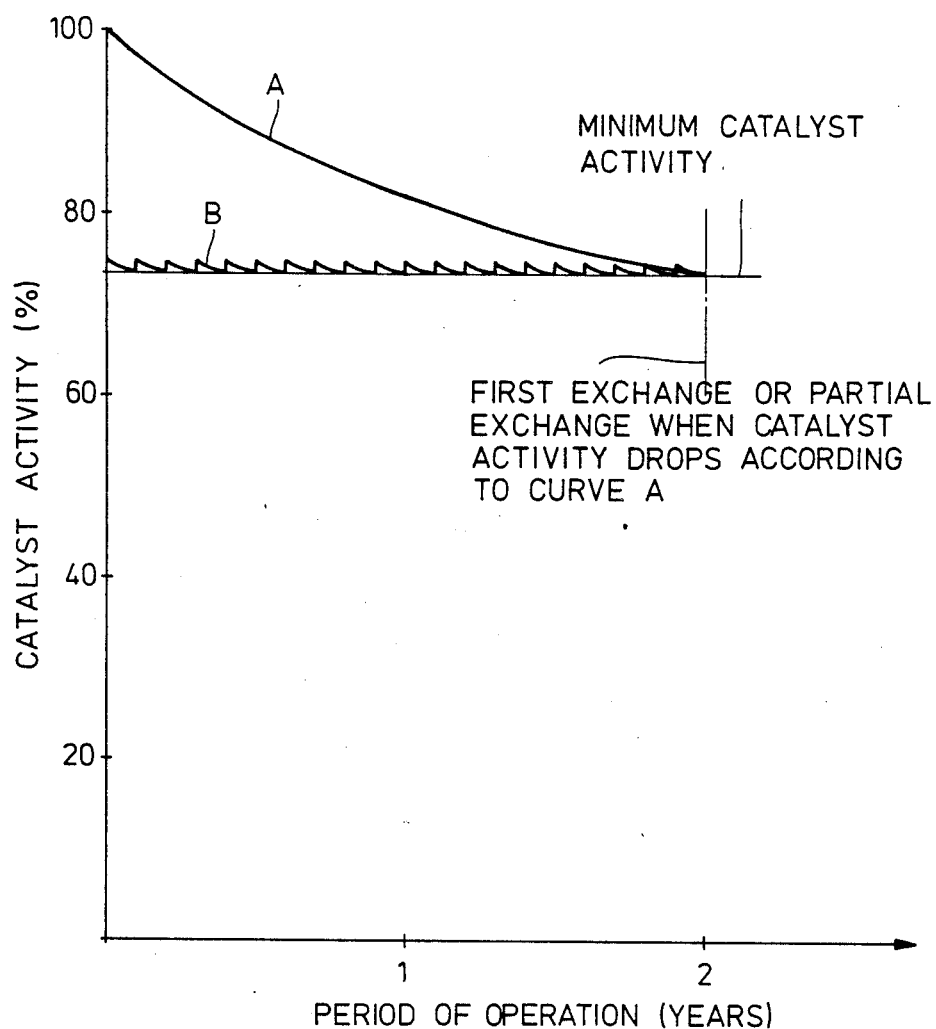
FIG. 4 is a diagram showing the catalytic activity over the period of operation.

Curve A in FIG. 4 shows the percent decrease of catalyst activity in a system according to FIG. 2. Curve B shows the catalyst activity during operation of the present invention. The activity of the system remains almost constant due to the quasi-continuous exchange of spent catalyst substance in the form of catalyst-coated heat-storage elements 2 with new or regenerated elements.

Figure 5:
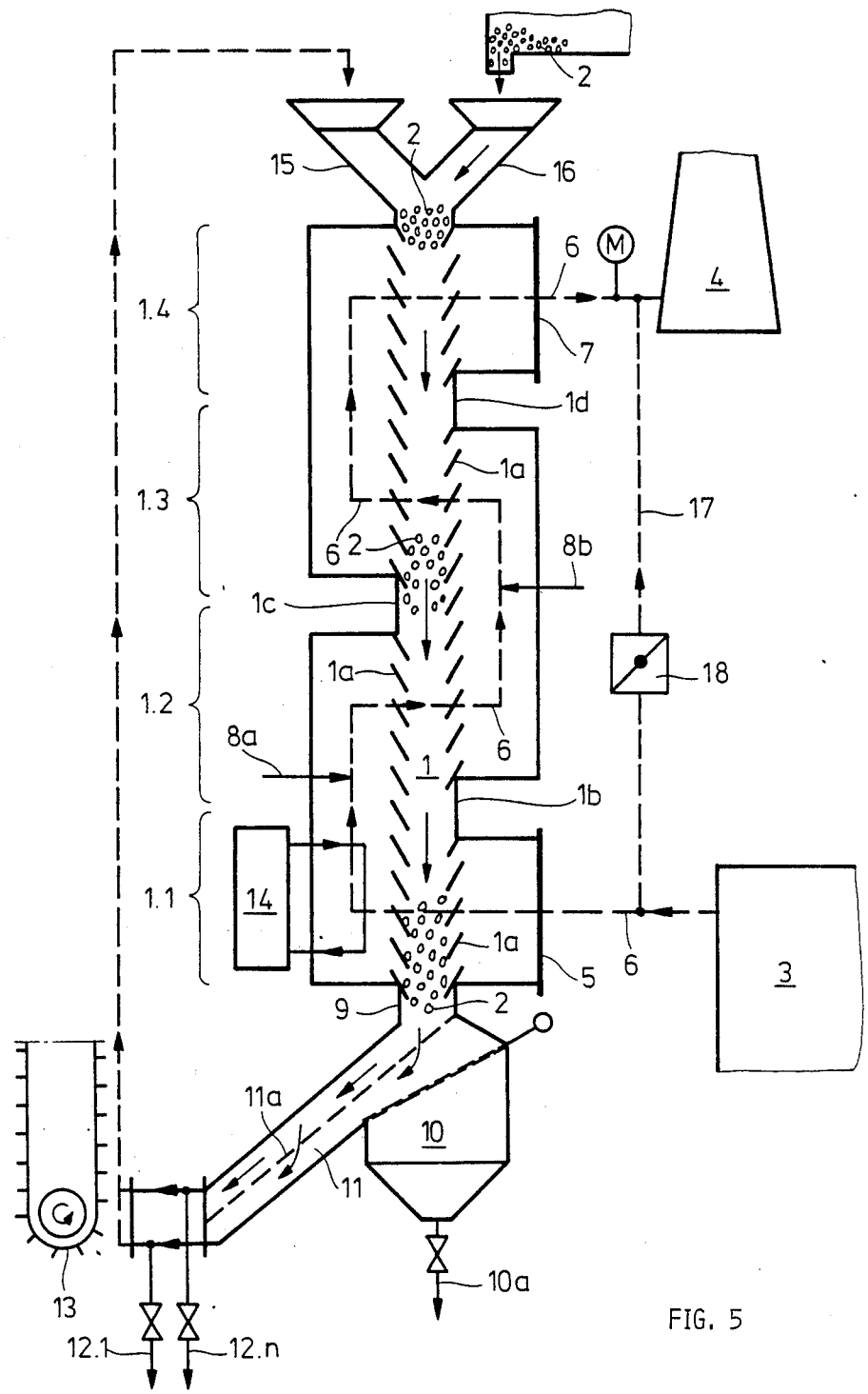
FIG. 5 is a schematic longitudinal section of a second embodiment of an apparatus for catalytically reducing noxious substances in flue gas according to the invention.

FIG. 5 shows a heat exchanger according to the second embodiment of the present invention in the form of a heat exchanger housing 1 which, functionally speaking, is subdivided into four sections, namely, a bottom section 1.1, a first middle section 1.2, a second middle section 1.3, and a top section 1.4. The heat exchanger housing 1 includes a chute for receiving and circulating heat storage elements 2 which are separately movable, e.g. spheres, with the chute being formed of gas permeable inner walls 1a and three housing constrictions 1b, 1c and 1d.

The bottom section 1.1 of the chute is provided with a connecting pipe 5 for the introduction of the flue gas stream 6 to be treated which comes from a desulfurization system 3 in which it was cooled. The top section 1.4 is provided with a connecting pipe 7 from which the flue gas stream 6, which has been freed of noxious substances, such as, $NO_x$ and $SO_x$, is introduced into a chimney 4. At least some of heat storage elements 2 are provided with a catalyst coating capable of catalyzing the reduction of noxious substances contained in the flue gas stream 6 as the heat storage elements are passed through the chute from the top section 1.4 to the bottom section 1.1. The heat storage elements 2 which are provided with the catalyst coating are divided into a plurality of groups, the groups differing from one another in at least one significant characteristic, such as a significant physical characteristic including size, shape, or weight, on the basis of which the groups can be separated from one another.

Below bottom section 1.1, heat storage elements 2 reach a discharge station 9 which is equipped with a cleaning device 10 and a discharge device 10a for removing residual dust and abrasion products, and a sorting device 11 which includes grates 11a. The various groups of heat storage elements 2 are separated from one another in sorting device 11, for example, by size. Sorting device 11 is provided with discharge fittings 12.1 through 12.n, where n is a positive finite number which ranges up to a number corresponding to the number of groups of heat storage elements 2. Discharge fittings 12.1 through 12.n make it possible to remove respective desired groups of heat storage elements 2. The remaining heat storage elements 2 are transported to the top section 1.4 by a circulating device 13 and a filling device 15 returns them to heat exchanger housing 1 at a point above top section 1.4. The heat storage elements 2 of a certain group, e.g., of a certain size, that are removed at a specific one of discharge fittings 12.1 through 12.n, are replaced by new or regenerated heat storage elements 2 of another group, e.g., of a different size, by charging replacement or regenerated heat storage elements 2 into filling device 16 positioned above top section 1.4.

The cooled flue gas stream 6 coming from desulfurization system 3 is initially conducted transversely through the chute in bottom section 1.1 and is thus preheated by heat storage elements 2 passing downwardly therethrough, to a temperature ranging, e.g., from 50° C. to 250° C. On the side of the lower section 1.1 of the chute which is opposite connecting pipe 5, flue gas stream 6 is heated to a predetermined reaction temperature as required for catalytical reduction of noxious substances, e.g., 350° C., by means of an external heating device 14 and is deflected upwardly through the heat exchange housing 1 from bottom section 1.1 to first middle section 1.2.

Then, a dosaging device 8a introduces ammonia into the heated flue gas stream 6 in first middle section 1.2. Flue gas stream 6 is conducted transversely through first middle section 1.2 of the chute, wherein a portion of the noxious substances, particularly $NO_x$, is catalytically reduced.

In the second middle section 1.3, more ammonia is introduced into the heated flue gas stream 6 as it is conducted transversely through second middle section 1.3. Ammonia is added by means of a second dosaging device 8b and remaining portions of the noxious substances are catalytically reduced.

The heat storage elements 2 passing through top section 1.4 are relatively cold compared to those passing through sections 1.3, 1.2 and 1.1, respectively, such that the flue gas stream 6 is cooled to about 80° C. by the relatively cold heat storage elements 2 in this section and is introduced into chimney 4 through connecting pipe 7.

The intake to chimney 4 is equipped with a measuring station M which monitors any residual noxious substances, including ammonia, still present in the flue gas stream 6. If the residual content of noxious substances and/or ammonia increases, this indicates that catalyst-coated heat storage elements 2 are spent and must be removed and replaced by new or regenerated catalyst-coated heat storage elements. The removal and replacement process can also be regulated in response to the noxious substance concentrations of the flue gas stream 6 as it leaves the desulfurization system 3 and is conducted into connecting pipe 5 of the heat exchanger housing 1.

Constrictions 1b, 1c, 1d have dimensions selected so that the flue gas stream 6 passing through the chute on a short-circuited path has a period of dwell which is the same as that of the flow gas stream 6 flowing transversely through the chute.

For operation under partial loading and during start-up and shut-down of the entire system, it is advisable to provide a bypass 17 equipped with a blocking and regulating flap 18 so that flue gas stream 6 circumvents the heat exchanger housing 1.

The invention now being fully described, it will be apparent to one of ordinary skill in the art that many changes and modifications can be made thereto without departing from the spirit or scope of the invention as set forth herein.

The present disclosure relates to the subject matter disclosed in German Patent No. P 35 36 958.2 filed Oct. 17th, 1985, and Federal Republic of Germany Patent Application No. P 36 37 871.2-43 filed Nov. 6th, 1986, the entire specifications of which are incorporated herein by reference.

It will be understood that the above description of the present invention is susceptible to various modifications, changes and adaptations, and the same are intended to be comprehended within the meaning and range of equivalents of the appended claims.

What is claimed is:

1. An apparatus for continuously pre-heating combustion air and catalytically reducing noxious substances in flue gas, comprising a heat-exchanger housing having a first part and a second part, and gas-permeable interior walls provided to contain and permit the flow of a plurality of separately movable heat-storage elements comprising catalyst-coated heat-storage elements, and a means providing a constrictive passage for the elements, said constrictive means operatively connected to said first part and said second part of said housing, said first part of said housing having an inlet for the elements and an inlet and an outlet for air, and said second part of said housing having an inlet and an outlet for flue gas and an outlet for the elements;

means for removal of said elements from the outlet for the elements and resupply of the elements to the inlet for the elements, the inlet and the outlet for the elements defining a first direction of flow of the elements which is transverse to a second direction of flow of air and flue gas;

means for measuring noxious substance concentrations of the flue gas exiting the top section of the heat exchanger and for causing disposing of heat storage elements having a spent catalyst coating thereon and substituting new heat storage elements therefore when the noxious substance concentrations exceed predetermined allowable noxious substance concentrations; and discharge means for the elements provided with a means for separating the elements by size, shape or weight, said discharge means being operatively connected to said second part of said housing and to said removal and resupply means at the outlet for the elements.

2. The apparatus of claim 1, further comprising
means for cleaning said elements, said cleaning means being provided with discharge means and being operatively connected to said housing and said discharge means at the outlet for said elements and located in the path of movement of the elements and downstream of said second part of the said housing.

3. The apparatus of claim 2, wherein
the means for cleaning said elements is an abrasive means.

4. The apparatus of claim 1, wherein
said second part of said housing is a cross countercurrent heat-exchanger having at least first and second temperature regions for said flue gas; and further comprising
heat-storage elements comprising at least two groups of catalyst-coated elements differing from each other in the catalyst, wherein the catalyst of one group is active at the temperature in the first region and the catalyst of the other group is active at the temperature of the second region of the cross countercurrent heat-exchanger.

5. The apparatus of claim 1, wherein the inlets and the outlets for the air and the flue gas are located on the side of said housing;

the outlet for the elements is located at the bottom of said housing; and the inlet for the elements is located at the top of said housing.

6. The apparatus of claim 1, wherein said second part of said housing is located in the path of movement of the elements downstream of said first part of said housing.

7. An apparatus for catalytically reducing noxious substances in flue gas, the apparatus comprising:

a plurality of heat storage elements which a separately movable and at least a portion of which are provided with a catalyst coating and are divided into a plurality of groups, each group of the plurality of groups differing from other groups of the plurality of groups in at least one physical characteristic on the basis of which the plurality of groups may be separated from one another;

a heat exchanger housing having interconnected sections including a top section, at least one middle section, and a bottom section, and having gas-permeable interior walls provided to contain and permit the flow of the plurality of heat storage elements in a direction of passage through the top section, the at least one middle section and the bottom section, in the order recited;

means connecting the bottom section of the heat exchanger housing to a source of flue gas and means connecting the top section of the heat exchanger housing to a chimney entrance;

means for removing the plurality of heat storage elements from the bottom section of the heat exchanger housing and means for reintroducing the plurality of the heat storage elements into the top section of the heat exchanger housing, the means for removing including a discharge means operatively connected to the bottom section of the heat exchanger housing and sorting means or separating the plurality of groups from one another and operatively connected to the discharge means and to the means for reintroducing the plurality of heat storage elements into the top section of the heat exchanger housing, wherein the heat exchanger housing repeatedly deflects the flow of flue gas such that the flue gas passes from the bottom section, through the at least one middle section, and through the top section in a direction which is transverse to the direction of passage of the plurality of heat storage elements, wherein the bottom section of the heat exchanger housing is provided with external heating means downstream of the flue gas for heating the flue gas to a predetermined reaction temperature, wherein the at least one middle section of the heat exchanger housing is provided with at least one means for dosaging ammonia therein for catalytic reduction of the noxious substances in the flue gas, and wherein the flue gas is cooled to a predetermined chimney entrance temperature in the top section of the heat exchanger housing.

8. The apparatus according to claim 7, wherein the sorting means separates the plurality of groups of heat storage elements from one another on the basis of the at least one physical characteristic, which at least one physical characteristic is selected from the group consisting of size, shape and weight.

9. The apparatus according to claim 7, wherein the plurality of heat storage elements have a spherical shape.

10. The apparatus according to claim 7, further comprising means for disposing of at least one spent group of the plurality of groups of heat storage elements and substituting therefor at least one different and unspent or regenerated group of the plurality of groups of heat storage elements.

11. The apparatus according to claim 10, further comprising means for measuring noxious substance concentrations of the flue gas exiting the top section of the heat exchanger and for causing disposing and substituting of the at least one spent group when the noxious substance concentrations exceed predetermined allowable noxious substance concentrations.

12. The apparatus according to claim 7, wherein the discharge means comprises means for cleaning the plurality of heat storage elements to remove dust and abrasion products therefrom.

* * * * *